(12) United States Patent
Ramakrishnan et al.

(10) Patent No.: US 12,018,838 B2
(45) Date of Patent: Jun. 25, 2024

(54) COWL ASSEMBLY FOR A GAS TURBINE ENGINE

(71) Applicant: General Electric Company, Schenectady, NY (US)

(72) Inventors: Kishore Ramakrishnan, Rexford, NY (US); Trevor Howard Wood, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/845,472

(22) Filed: Jun. 21, 2022

(65) Prior Publication Data
US 2023/0408091 A1 Dec. 21, 2023

(51) Int. Cl.
| F23R 3/04 | (2006.01) |
| B64C 9/24 | (2006.01) |
| B64D 29/06 | (2006.01) |
| F02C 7/04 | (2006.01) |
| F02K 1/34 | (2006.01) |

(52) U.S. Cl.
CPC ............... *F23R 3/04* (2013.01); *B64D 29/06* (2013.01); *F02C 7/04* (2013.01); *B64C 9/24* (2013.01); *B64D 33/06* (2013.01); *F05D 2220/36* (2013.01)

(58) Field of Classification Search
CPC ..................................... F23R 3/04; F02C 7/04
See application file for complete search history.

(56) References Cited

U.S. PATENT DOCUMENTS

| 3,138,921 A | | 6/1964 | Prince, Jr. |
| 3,153,319 A | * | 10/1964 | Young .................... F02K 1/46 |
| | | | 239/265.19 |
| 3,243,126 A | | 3/1966 | Kurti et al. |
| 3,598,318 A | | 8/1971 | Schiel |
| 3,717,304 A | * | 2/1973 | Sutton ................... F02K 1/563 |
| | | | 239/265.19 |
| 3,829,020 A | | 8/1974 | Stearns |
| 4,176,792 A | | 12/1979 | McCardle, Jr. |
| 4,754,924 A | | 7/1988 | Shannon |

(Continued)

FOREIGN PATENT DOCUMENTS

| GB | 1114478 A | 5/1968 | |
| GB | 2372779 A | * 9/2002 | ............... F02K 1/06 |

(Continued)

*Primary Examiner* — Jason H Duger
(74) *Attorney, Agent, or Firm* — Dority & Manning, P.A.

(57) ABSTRACT

An aerodynamic device defining a thickness direction is provided. The aerodynamic device configured to produce lift or thrust or configured to be a part of an aerodynamic system that produces lift or thrust. The aerodynamic device includes a cowl assembly that defines at least in part an airflow stream. The cowl assembly includes a first cowl and a second cowl moveable relative to the first cowl. The first cowl includes a plurality of first cowl indentations at an end of the first cowl. The second cowl defines an outer surface along the thickness direction and an inner surface along the radial direction. The second cowl includes a plurality of second cowl indentations complementary in shape to the plurality of first cowl indentations. The plurality of second cowl indentations are positioned locally on the outer surface of the second cowl or locally on the inner surface of the second cowl.

19 Claims, 9 Drawing Sheets

(56) References Cited

U.S. PATENT DOCUMENTS

| | | | |
|---|---|---|---|
| 4,802,629 A | | 2/1989 | Klees |
| 5,216,878 A | | 6/1993 | Klees |
| 5,221,048 A | | 6/1993 | Lair |
| 6,546,716 B2 | | 4/2003 | Lair |
| 7,600,384 B2 | * | 10/2009 | Chanez .................. F02K 1/72 60/770 |
| 8,074,440 B2 | | 12/2011 | Kohlenberg et al. |
| 8,430,203 B2 | | 4/2013 | Caruel et al. |
| 8,613,398 B2 | | 12/2013 | Calder et al. |
| 8,800,261 B2 | | 8/2014 | Hall et al. |
| 8,973,364 B2 | | 3/2015 | Gilson et al. |
| 8,997,497 B2 | | 4/2015 | Hall et al. |
| 9,394,852 B2 | | 7/2016 | Atassi et al. |
| 9,494,084 B2 | | 11/2016 | Kohlenberg et al. |
| 9,745,918 B2 | | 8/2017 | Gilson et al. |
| 9,976,515 B2 | | 5/2018 | Akatsuka et al. |
| 10,087,885 B2 | | 10/2018 | Kohlenberg et al. |
| 10,563,614 B2 | | 2/2020 | Smith et al. |
| 2006/0016171 A1 | * | 1/2006 | Renggli ................ F02K 1/386 60/204 |
| 2011/0120079 A1 | | 5/2011 | Schwark, Jr. et al. |

FOREIGN PATENT DOCUMENTS

| | | | |
|---|---|---|---|
| GB | 2372779 | A | 9/2002 |
| WO | WO 83/03281 | A1 | 9/1983 |
| WO | WO2019121022 | A1 | 6/2019 |

* cited by examiner

COWL ASSEMBLY FOR A GAS TURBINE ENGINE

FIELD

The present disclosure generally relates to a gas turbine engine and, more particularly, to a cowl assembly with noise reduction features.

BACKGROUND

A gas turbine engine generally includes a fan and a turbomachine arranged in flow communication with one another. Additionally, the turbomachine of the gas turbine engine includes, in serial flow order, a compressor section, a combustion section, a turbine section, and an exhaust section. In operation, air is provided from the fan to an inlet of the compressor section where one or more axial compressors progressively compress the air until it reaches the combustion section to provide combustion gases. The combustion gases are routed from the combustion section to the turbine section. The flow of combustion gasses through the turbine section drives the turbine section and is then routed through the exhaust section, e.g., to the atmosphere.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
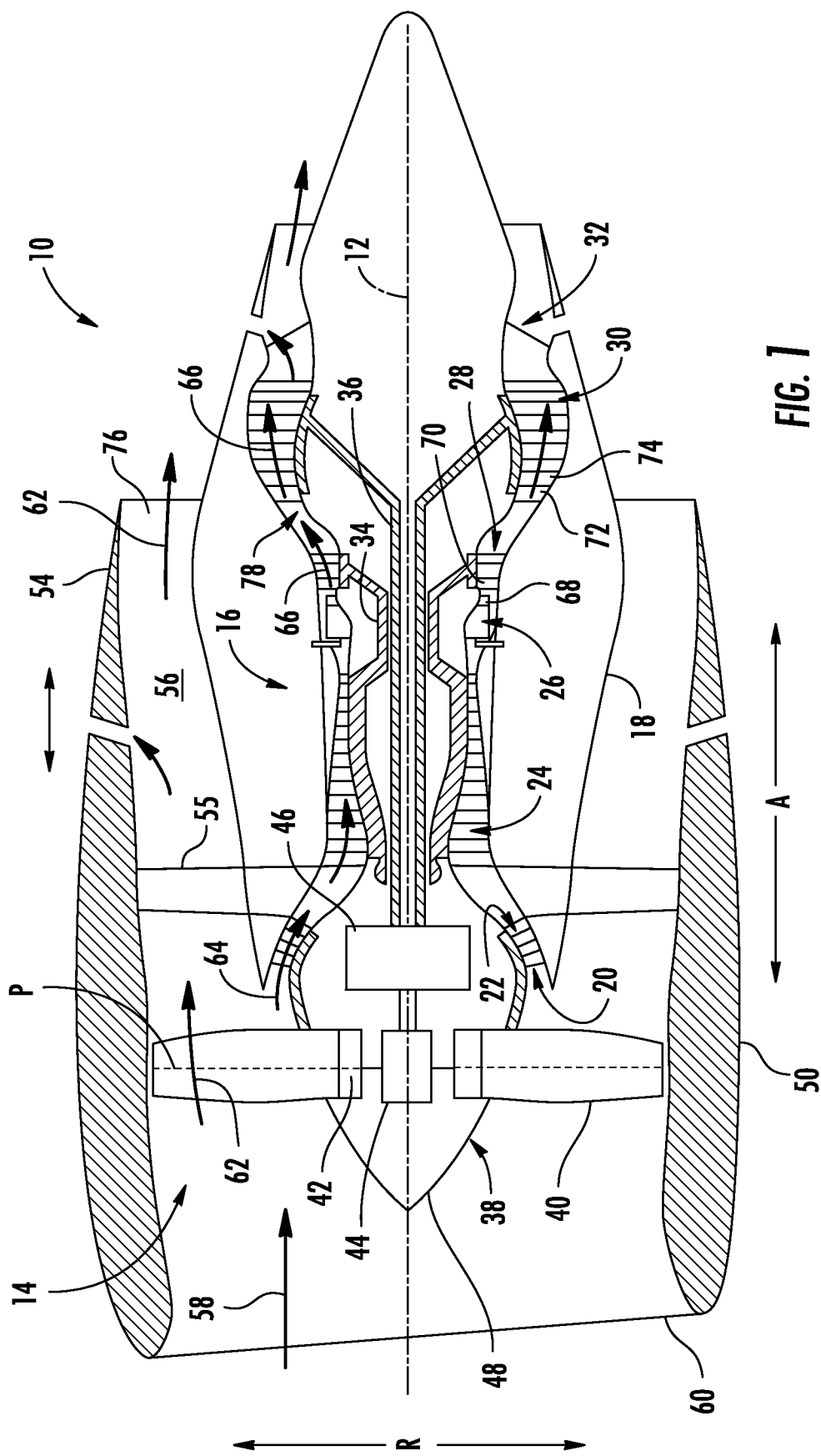
FIG. 1 is a schematic cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., —er, where applicable), when used with a compressor, a turbine, a shaft, or spool components, etc. each refer to relative speeds within an engine unless otherwise specified. For example, a "low pressure turbine" or "low speed turbine" defines a component configured to operate at a rotational speed, such as a maximum allowable rotational speed, lower than a "high pressure turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As may be used herein, the terms "axial" and "axially" refer to directions and orientations that extend substantially parallel to a centerline of the gas turbine engine. Moreover, as may be used herein, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

An aerodynamic device configured to produce lift or thrust or be a part of a propulsor that produces lift of thrust is provided. The aerodynamic device defines a thickness direction and includes a cowl assembly that may define at least in part an airflow stream and may include a forward cowl and an aft cowl. As used herein, the term "thickness direction" is used to generally refer to the direction from an inner surface to an outer surface. The thickness direction may be defined locally at a cross-section of the aerodynamic device. At least one of the forward cowl or the aft cowl may be moveable to open a flow passage in a deployed position and may be moveable to close the flow passage in a stowed position. The forward cowl may include a plurality of forward cowl indentations and the aft cowl may include a plurality of aft cowl indentations complementary in shape to the plurality of forward cowl indentations. The aft cowl may define an outer surface and a juncture where the plurality of forward cowl indentations may meet the outer surface of the aft cowl when in the stowed position.

For example, the aerodynamic device may be a variable area fan nozzle of a gas turbine engine. More particularly, during an operating condition of the gas turbine engine, a cowl assembly e.g., translating cowl, of the variable area fan nozzle may be in the deployed position. In the deployed position, a fan of the gas turbine engine may produce thrust during various operating conditions of the gas turbine engine. In the deployed position however, the flow passage is opened which may cause the flow of air passing through to create vortices shed from the trailing edge of the forward cowl that may impinge on the aft cowl. These vortices are shed at approximately the same time over a circumferential extent of the forward cowl trailing edge, i.e., correlated in time. These correlated vortices impinging on the aft cowl can result in significant noise and vibration. To mitigate these adverse effects, the plurality of forward cowl indentations may be configured to break up the shedding and decorrelate the vortices that may impinge on the aft cowl, resulting in a reduction in noise and vibration generated by the aft cowl.

Additionally or alternatively, in another exemplary embodiment of the cowl assembly, the forward cowl and the aft cowl may be moveable to open a flow passage in the deployed position and close the flow passage in the stowed position. The forward cowl of the exemplary embodiment may define an inner surface and a juncture where a leading edge of the aft cowl meets the inner surface of the forward cowl in the stowed position. Further, the plurality of forward cowl indentations may be positioned locally on the inner surface of the forward cowl at the juncture. The aft cowl includes a second plurality of aft cowl indentations at the leading edge of the aft cowl. By varying the position of the leading edge of the aft cowl using the indentations, the unsteady pressures generated by the impinging vortices from the forward cowl are decorrelated in time resulting in reduced noise generation and vibration of the aft cowl.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. It should be appreciated that in the exemplary embodiment depicted, the fan 38 is configured to be a variable pitch fan 38. The fan may be driven directly by LP shaft 36 or through a power gearbox 46. However, the variable pitch fan 38 is provided by way of example only. In alternative embodiments, the fan may be a fixed pitched fan (direct or geared) or any other suitable fan. Each fan blade 40 is rotatable relative to the disk 42 about a pitch axis P by virtue of the fan blades 40 being operatively coupled to a suitable actuation member 44 configured to vary the pitch of the fan blades 40. The fan blades 40, disk 42, and actuation member 44 are together rotatable about the longitudinal axis 12 by LP shaft 36 across the power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by a rotatable front spinner 48 aerodynamically contoured to promote an airflow through the plurality of fan blades 40. Additionally, the exemplary fan section 14 includes a cowl assembly or outer nacelle 50 that circumferentially surrounds the fan 38 and/or at least a portion of the turbomachine 16. It should be appreciated that the nacelle 50 may be configured to be supported relative to the turbomachine 16 by a plurality of circumferentially-spaced outlet guide vanes 52. Moreover, a downstream section 54 of the nacelle 50 may extend over an outer portion of the turbomachine 16 so as to define a bypass airflow passage 56 therebetween. Additionally, the nacelle 50 may be moveable between a deployed and a stowed position. In particular, the downstream section 54 may be configured to translate along the axial direction A, as will be described in more detail below, to open up a flow passage and allow air to flow therethrough. In such a manner, the downstream section 54 of the outer nacelle may be referred to as a translating cowl assembly, i.e., translating cowl of a variable area exhaust nozzle.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 via sequential stage of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, as noted, the turbofan engine 10 includes a translating cowl of a variable area exhaust nozzle. In additional or alternative embodiments, the turbofan engine 10 may include any other suitable cowl assembly that is moveable to open a flow passage in a deployed position and moveable to close the flow passage in the closed position. As used herein, the term "cowl assembly" refers generally to an aerodynamic component of an aerodynamic device configured to direct an airflow to assist the aerodynamic device in producing lift or thrust. The cowl assembly may therefore be configured as part of a variable flow nozzle, an exhaust nozzle, a supersonic inlet, a wing, or the like. For example, the turbofan engine 10 (or other gas turbine engine of the present disclosure) may include an inlet of a supersonic aircraft engine configured to translate between a deployed position and a closed position, a translating cowl of a mixed flow exhaust nozzle configured to translate between a deployed position and a stowed position, a wing-slat configured to translate between a deployed position and a stowed position, or a high-lift wing configured to translate between a deployed position and a stowed position.

Figure 2:
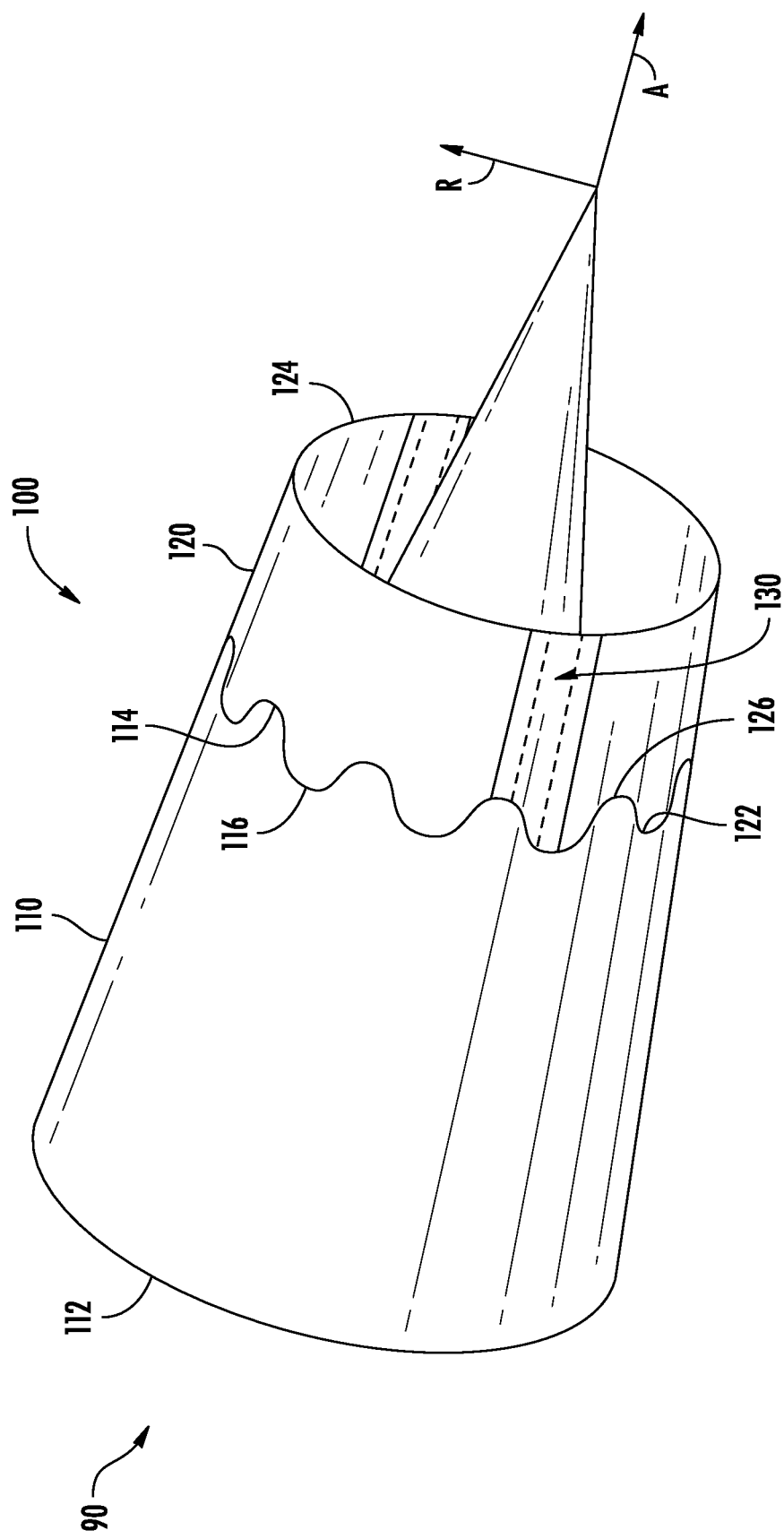
FIG. 2 is a simplified view of a mixed flow exhaust nozzle in accordance with an exemplary embodiment of the present disclosure in a first position.
Figure 3:
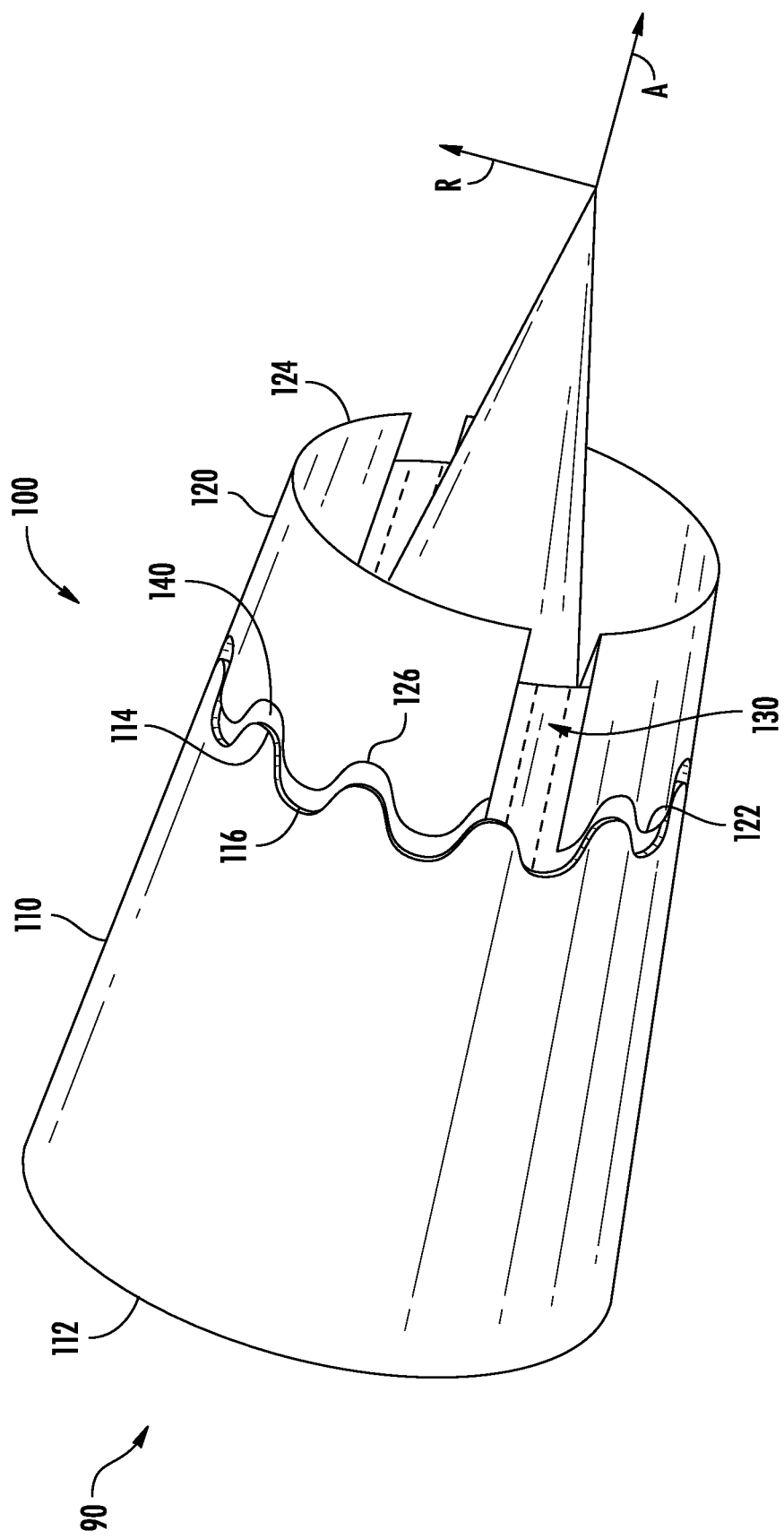
FIG. 3 is a simplified view of the mixed flow exhaust nozzle of FIG. 2 in a second position.

Referring now to FIGS. 2 and 3, simplified views of a mixed flow exhaust nozzle 90 for a gas turbine engine in accordance with aspects of the present disclosure are provided. The mixed flow exhaust nozzle 90 of FIGS. 2 and 3 may be incorporated into the turbofan engine 10 of FIG. 1, e.g., as a downstream section of the tubular outer casing 18, or at the jet exhaust nozzle section 32. Alternatively, however, the mixed flow exhaust nozzle 90 of FIGS. 2 and 3 may be incorporated into any other suitable gas turbine engine.

It will be appreciated that although a mixed flow exhaust nozzle 90 is shown in FIGS. 2 and 3, in other embodiments any other suitable variable exhaust nozzle may be provided, such as a variable flow exhaust nozzle.

The mixed flow exhaust nozzle 90 includes a cowl assembly 100 that defines an airflow stream downstream of the turbomachine 16. The cowl assembly 100 includes a first cowl 110 and a second cowl 120, or more specifically for the embodiment depicted, a forward cowl 110 and an aft cowl 120. The forward cowl 110 includes a trailing edge 114 and a plurality of first cowl indentations 116, or more specifically a plurality of forward cowl indentations 116. The aft cowl 120 includes a leading edge 122, a trailing edge 124, and a plurality of second cowl indentations 126 that are complementary in shape to the plurality of first cowl indentations 116. More specifically, the aft cowl 120 includes a plurality of aft cowl indentations 126 that are complementary in shape to the plurality of forward cowl indentations 116. As used herein, the term "complementary in shape" with respect to a first geometry and a second geometry, refers to the second geometry being substantially the inverse of the first geometry, such that the first and second geometries together provide a flush mating surface when positioned together, i.e., an exterior surface of the first geometry and an exterior surface of the second geometry are flush when in a stowed position. The first and second geometries, in the context of this definition, may refer to the forward and aft cowl indentations 116, 126, the forward and aft cowl indentations 115, 125 (described below with regard to FIG. 6), or both.

Further, the mixed flow exhaust nozzle 90 includes one or more support members 130 positioned proximate the trailing edge 114 of the forward cowl 110, wherein "proximate the trailing edge" refers to a position closer to the trailing edge 114 of the forward cowl 110 than a forward end 112 of the forward cowl 110. In the exemplary embodiment, the one or more support members 130 extend along the axial direction A from the forward cowl 110 and are mechanically coupled to the aft cowl 120. In one embodiment, the support members 130 are manufactured as part of the forward cowl 110. Alternatively, the support members 130 may be separately manufactured and attached to, e.g., the trailing edge 114 of the forward cowl 110 via welding, screws, or any other means. As shown in the exemplary embodiment, each support member 130, may define an elongated portion extended from the forward cowl 110. In the exemplary embodiment, there are two support members 130 that extend on opposite sides of the aft cowl 120. Additionally, the support members 130 may define receiving structures mechanically coupling the aft cowl 120 to the support members 130.

Referring now specifically to FIG. 2, illustrated is the mixed flow exhaust nozzle 90 in a stowed position. In the stowed position the plurality of forward cowl indentations 116 are immediately adjacent the plurality of aft cowl indentations 126. For example, the plurality of aft cowl indentations 126 located on the leading edge 122 of the aft cowl 120 may mate and be flush with the plurality of forward cowl indentations 116 on the trailing edge 114 of the forward cowl 110. Further, as shown in the exemplary embodiment, the one or more support members 130 include two or more elongated portions that extend across the aft cowl 120 to the trailing edge 114 of the forward cowl 110 when the aft cowl 120 is in the stowed position. It will be appreciated that the two or more elongated portions may alternatively extend only partially across the aft cowl 120, e.g., the elongated portions may extend less than halfway, about halfway, or more than halfway across the aft cowl.

Referring now to FIG. 3, it will be appreciated that the aft cowl 120 is configured to translate relative to the forward cowl 110 to a deployed position. More specifically, for the embodiment shown, the aft cowl 120 is configured to translate along the axial direction A, along the support members 130 between the stowed position (FIG. 2) and the deployed position (FIG. 3). The aft cowl 120 is shown in FIG. 3 in the deployed position. As discussed previously, a space between the aft cowl 120 and the forward cowl 110 when the aft cowl 120 is in the deployed position defines a flow passage 140. By opening the flow passage 140, a flow output through the gas turbine engine is able to exit through the flow passage 140 and an effective nozzle exit area of the mixed flow exhaust nozzle 90 is increased.

Figure 4:
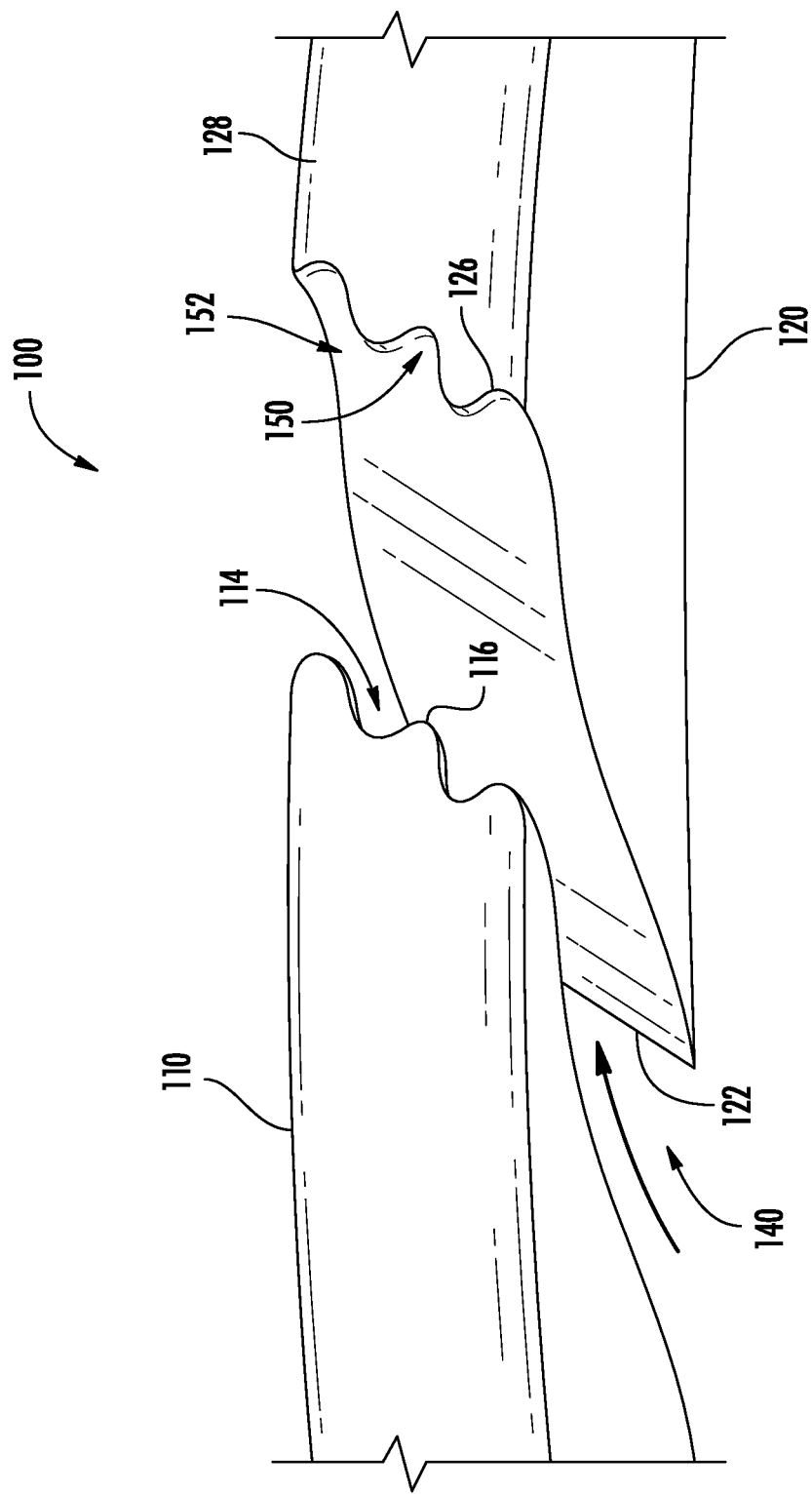
FIG. 4 is a simplified view of a cowl assembly of an aerodynamic device in accordance with an exemplary embodiment of the present disclosure.

Referring now to FIG. 4 a simplified close-up view of a cowl assembly 100 of a mixed flow exhaust nozzle 90 in accordance with another exemplary aspect of the present disclosure is provided. The exemplary cowl assembly 100 of FIG. 4 may be configured in substantially the same manner as the exemplary cowl assembly 100 of FIGS. 2 and 3, and accordingly, the same or similar numbers may refer to the same or similar parts.

For example, the exemplary cowl assembly 100 of FIG. 4 generally includes a forward cowl 110 and an aft cowl 120. The forward cowl 110 generally includes a trailing edge 114 and a plurality of forward cowl indentations 116. The aft cowl 120 generally includes an outer surface 128, a leading edge 122, and a plurality of aft cowl indentations 126 complimentary in shape to the plurality of forward cowl indentations 116. For the embodiment of FIG. 4, the aft cowl 120 is configured to define a juncture 150 where the trailing edge 114 of the forward cowl 110 meets the outer surface 128 of the aft cowl 120 in the stowed position (see also FIG. 2). The aft cowl indentations 126 are positioned locally on the outer surface 128 of the aft cowl 120 at the juncture 150. For example, the plurality of forward cowl indentations 116 mate with and are flush with the plurality of aft cowl indentations 126 at the juncture 150 in the stowed position (see also FIG. 2). More specifically, the aft cowl 120 defines a local region 152 encompassing the juncture 150. As used herein, the term "local region" with respect to indentations, such as aft cowl indentations 126, refers to an area that is non-uniform in a direction along a surface of the cowl assembly (such as in a circumferential direction along the outer surface 128 of the aft cowl 120 in the embodiment shown) that is adjacent to the juncture 150 and that further defines a mating surface for complementary cowl indentations on an opposing cowl (e.g., the plurality of forward cowl indentations 126 in the embodiment shown). Notably, in other embodiments, such as the embodiment of FIGS. 8 and 9 described below, the term local region with respect to indentations refers to an area that is non-uniform in a spanwise direction along a surface of the cowl assembly that is adjacent to the juncture and that further defines a mating surface for complementary cowl indentations on an opposing cowl.

During an operating condition of the gas turbine engine, the forward cowl 110 and the aft cowl 120 may be moveable to open the flow passage 140 in the deployed position. As discussed previously, by opening the flow passage 140, flow output through the gas turbine engine is able to exit through the flow passage 140. As the flow output passes by the trailing edge 114 of the forward cowl 110, correlated vortices may form. These correlated vortices may impinge on the aft cowl 120 causing noise and vibration. The plurality of forward cowl indentations 116 may feature a smooth sweep that is operable to disrupt the shedding and decorrelate the vortices that may impinge on the aft cowl 120. In the exemplary embodiment of FIG. 4, the plurality of forward cowl indentations 116 and the complementary plurality of aft cowl indentations 126 are scallops.

It will be appreciated that the exemplary plurality of forward cowl indentations 116 and the plurality of aft cowl indentations 126 of FIG. 4 are provided by way of example only, and that in other exemplary embodiments any other suitable plurality of forward cowl indentations 116 and plurality of aft cowl indentations 126 may be provided. For example, although the exemplary plurality of forward cowl indentations 116 and plurality of aft cowl indentations 126 feature a smooth transition in the form of scallops, in other exemplary embodiments of the present disclosure the plurality of forward cowl indentations 116 and the plurality of aft cowl indentations 126 may not include a smooth transition and may be at least one of a step (see, e.g., FIG. 5, below), a wire (e.g., a plurality of wires spaced along a length of the opening defining indentations), a fence (e.g., a separate structure attached to the forward and/or aft cowl to form the indentations), a rib (e.g., protrusions extending from a surface of the forward and/or aft cowl to define the indentations), a groove (e.g., grooves formed in a surface of the forward and/or aft cowl to form the indentations), a chevron, a scalloped waveform, a tab, a tubercle, or any suitable combination thereof. Additionally, or alternatively, although the exemplary plurality of forward cowl indentations 116 and the plurality of aft cowl indentations 126 are depicted as features with a smooth sweep, in other exemplary embodiments the plurality of forward cowl indentations 116 and the plurality of aft cowl indentations 126 may alternatively utilize a rigid transition with a yaw in a circumferential direction of the cowl assembly 100, as described below.

Further, it should be appreciated that in other exemplary embodiments the plurality of forward cowl indentations 116 and the plurality of aft cowl indentations 126 may additionally or alternatively include an embedded acoustic liner (not shown). The embedded acoustic liner may be configured to attenuate noise generated by vortices that may impinge on the aft cowl 120 of the cowl assembly. The embedded acoustic liner may be embedded in the plurality of aft cowl indentations 126, in between the plurality of aft cowl indentations 126, in the plurality of forward cowl indentations 116, in between the plurality of forward cowl indentations 116, or a combination thereof. Additionally, or alternatively, in alternative exemplary embodiments the plurality of forward cowl indentation 116 and the plurality of aft cowl indentations 126 may include a porous structure. The porous structure may be configured to attenuate noise generated by the vortices that may impinge on the aft cowl 120 of the cowl assembly.

Figure 5:
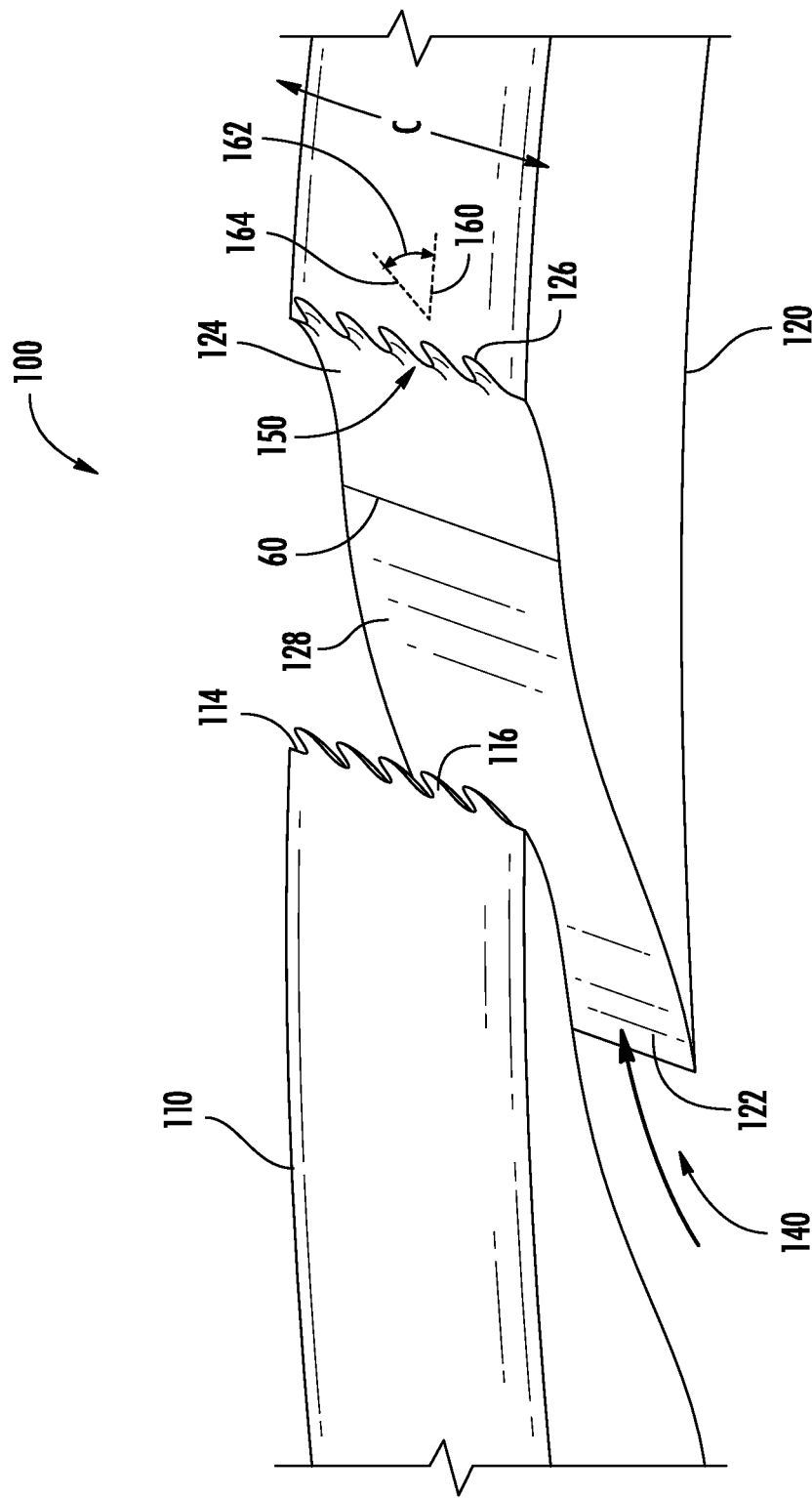
FIG. 5 is a simplified view of a cowl assembly of an aerodynamic device in accordance with another exemplary embodiment of the present disclosure.

Referring now to FIG. 5, a simplified view of a cowl assembly 100 for a gas turbine engine in accordance with another exemplary aspect of the present disclosure is provided. The exemplary cowl assembly 100 of FIG. 5 may be configured in substantially the same manner as the exemplary cowl assembly 100 of FIG. 4, and accordingly, the same or similar numbers may refer to the same or similar parts.

For example, the exemplary cowl assembly 100 of FIG. 5 generally includes a forward cowl 110 and an aft cowl 120. The forward cowl 110 generally includes a plurality of forward cowl indentations 116, and the aft cowl 120 generally includes a plurality of aft cowl indentations 126 complementary in shape to the plurality of forward cowl indentations 116. Further, the aft cowl 120 defines a juncture 150 where the trailing edge 114 of the forward cowl 110 meets the outer surface 128 of the aft cowl 120 when in the stowed position (see FIG. 2). However, for the embodiment of FIG. 5 the cowl assembly 100 defines a circumferential direction C and the plurality of forward cowl indentations 116 have a yaw in the circumferential direction C and the complementary plurality of aft cowl indentations 126 have a complementary yaw. It should be appreciated that the plurality of forward cowl indentations 116 and the complementary plurality of aft cowl indentations 126 are configured as steps. In such a manner the term "steps" as used herein to refer to indentations that have the yaw in the circumferential direction C. In particular, with reference to the aft cowl indentations 126, the aft cowl indentations 126 extending in a first direction 164 that defines an angle 162 relative to a reference line 160 (the reference line 160 being parallel to the axial direction A of the gas turbine engine). More specifically, the angle 162 is defined in a reference plane that is in turn defined by a tangent to the circumferential direction C and the axial direction A.

The yaw of the steps in the circumferential direction C may decorrelate the vortices that may impinge on the aft cowl 120 while the cowl assembly 100 is in the deployed position (shown). Additionally, in the stowed position (see FIG. 2) the plurality of forward cowl indentations 116 mate with and are flush with the plurality of aft cowl indentations 126 at the juncture 150.

Figure 6:
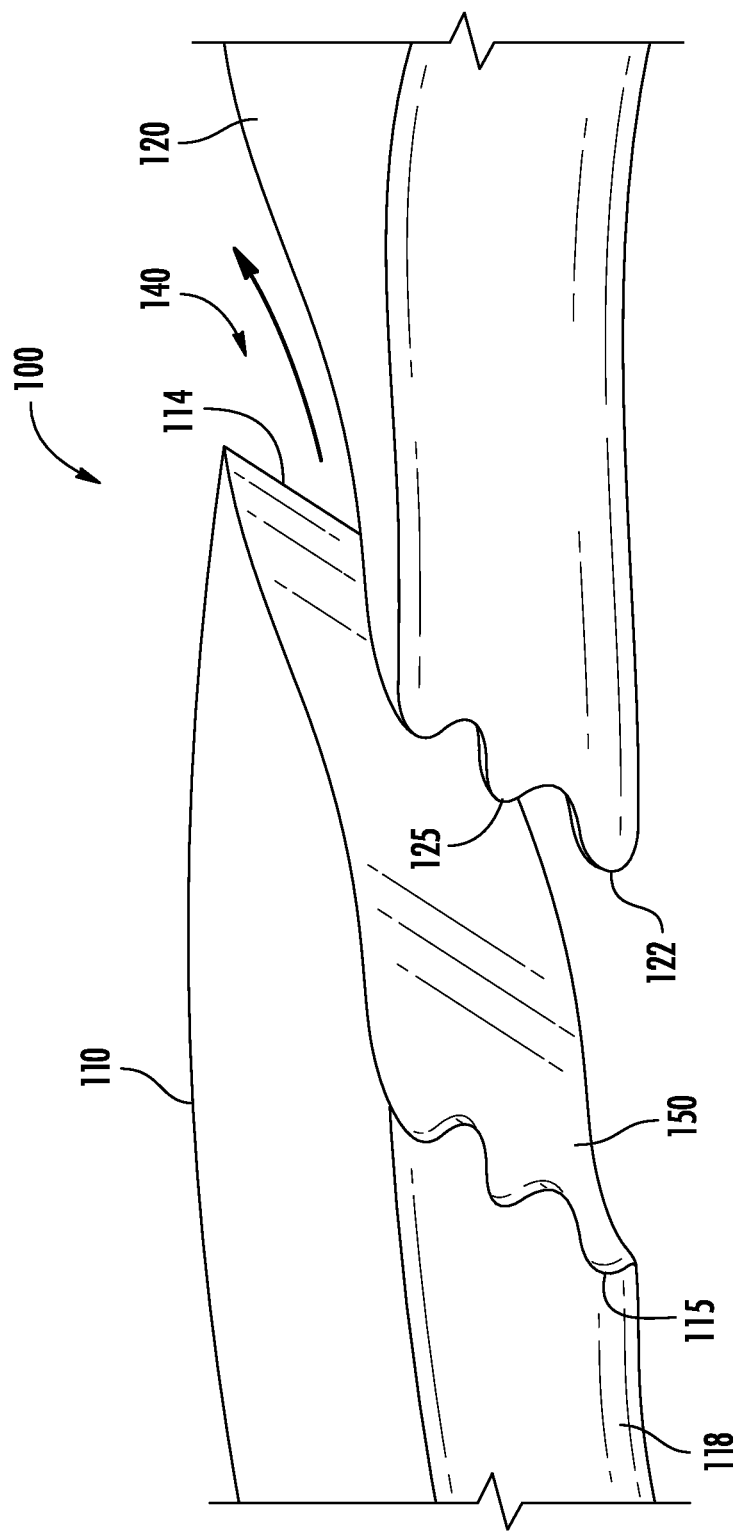
FIG. 6 is a simplified view of a cowl assembly of an aerodynamic device in accordance with yet another exemplary embodiment of the present disclosure.

Referring now to FIG. 6, a simplified view of a cowl assembly 100 for a gas turbine engine in accordance with another exemplary aspect of the present disclosure is provided. The exemplary cowl assembly 100 may be configured in substantially the same manner as the exemplary cowl assemblies 100 of FIGS. 4 and 5, and accordingly the same or similar numbers may refer to the same or similar parts.

For example, the exemplary cowl assembly 100 of FIG. 6 generally includes a forward cowl 110 and an aft cowl 120. The aft cowl 120 generally defines a leading edge 122. However, for the embodiment of FIG. 6, the forward cowl 110 further defines an inner surface 118 and a juncture 150. The juncture 150 is where the leading edge 122 of the aft cowl 120 meets the inner surface 118 of the forward cowl 110 when in the stowed position (see, e.g., embodiment of FIG. 2). Further, the forward cowl 110 includes a first plurality of forward cowl indentations 115 positioned locally on the inner surface 118 of the forward cowl 110 at the juncture 150. Additionally, the aft cowl 120 includes a second plurality of aft cowl indentations 125 at the leading edge 122 of the aft cowl 120. The second plurality of forward cowl indentations 115 are complementary in shape with the second plurality of aft cowl indentations 125.

Inclusion of the second plurality of aft cowl indentations 125 on the leading edge 122 of the aft cowl 120 may decorrelate the unsteady pressure generated by the vortices through the flow passage 140 and over the trailing edge 114 of the forward cowl 110 that may impinge on one or more downstream structures, reducing the amount of noise and vibration generated.

Figure 7:
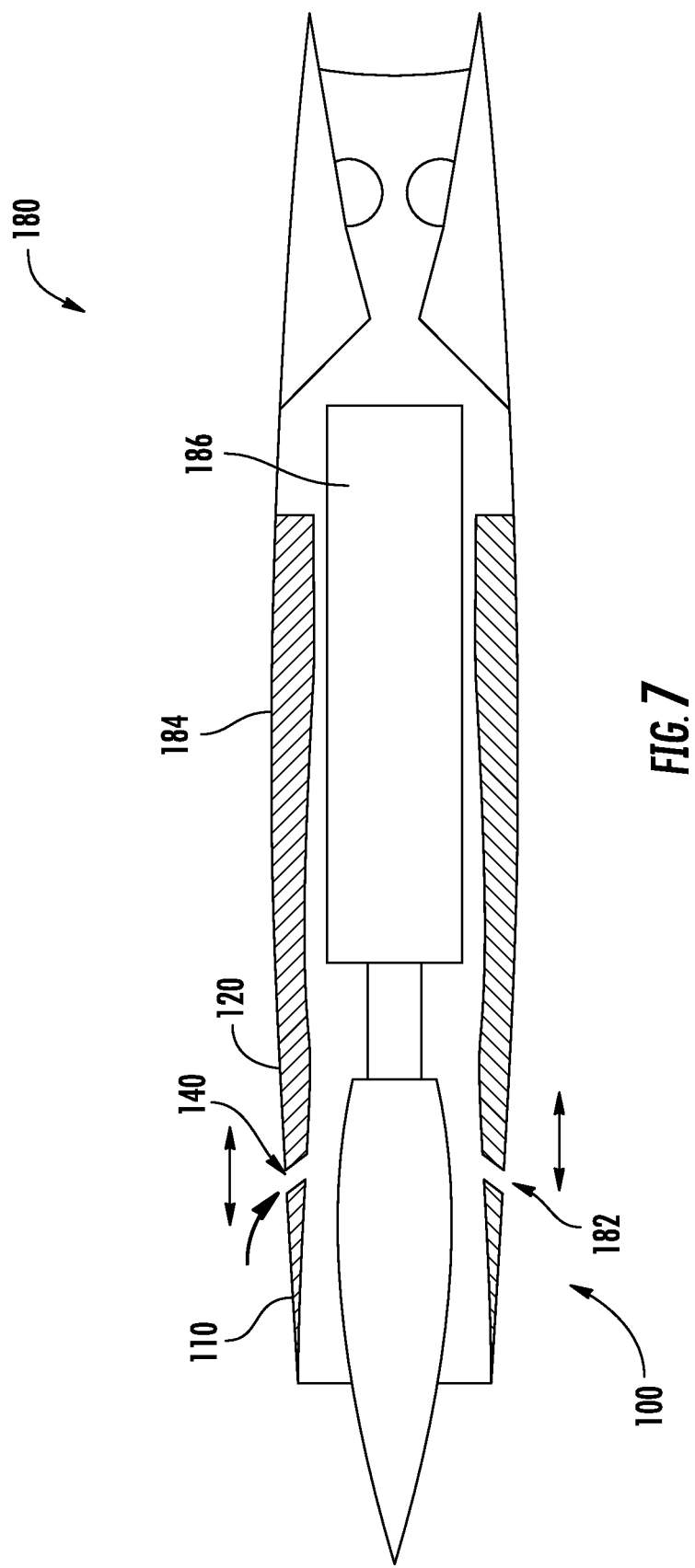
FIG. 7 is a schematic cross-sectional view of a supersonic aircraft engine in accordance with an exemplary embodiment of the present disclosure.

Referring now to FIG. 7, a schematic cross-sectional view of a supersonic aircraft engine 180 in accordance with another exemplary embodiment of the present disclosure is provided. The supersonic aircraft engine 180 generally includes an inlet 182, an outer nacelle 184 and a turbomachine 186. The inlet 182 is located upstream of the turbomachine 186 and further includes a cowl assembly 100, i.e., a translating cowl. The exemplary cowl assembly 100 of FIG. 7 may be configured in substantially the same manner as the exemplary cowl assemblies 100 of FIGS. 1 through 6, and accordingly, the same or similar numbers may refer to the same or similar parts.

For example, the cowl assembly of FIG. 7 includes a forward cowl 110 and an aft cowl 120. Further, the cowl assembly 100 is configured to be moveable to open a flow passage 140 in a deployed position and moveable to close the flow passage 140 in the stowed position. However, for the embodiment of FIG. 7, the forward cowl 110 is configured to translate relative to the aft cowl 120 to open the flow passage in the deployed position.

Figure 8:
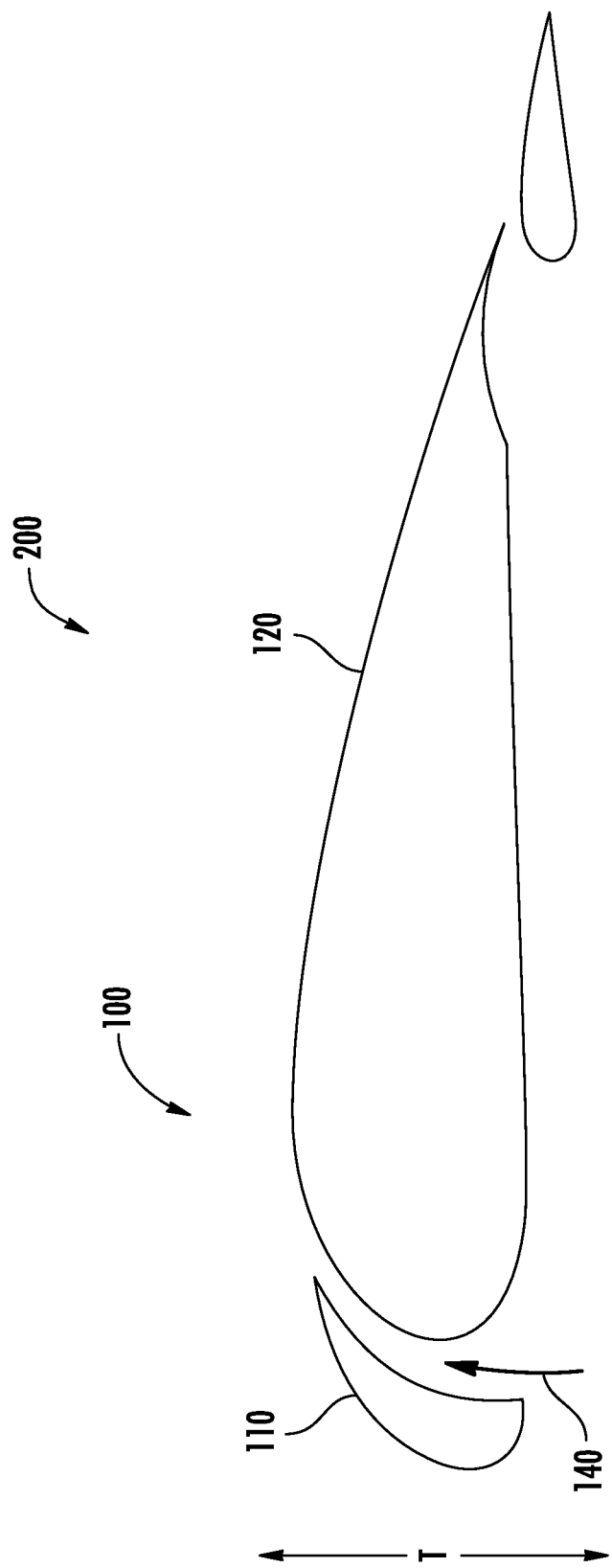
FIG. 8 is a simplified view of an aerodynamic device in accordance with another exemplary embodiment of the present disclosure.

Referring now to FIG. 8, a simplified view of an aerodynamic device in accordance with an exemplary embodiment of the present disclosure is provided. The aerodynamic device is a wing-slat assembly 200 for a high-lift wing of an aircraft. The view of FIG. 8 is a spanwise cross sectional view of the wing along a length of the wing. Conventionally, the deployment of a slat from the main of the wing is provided to increase lift of the aircraft during a low speed operating condition of the aircraft. For example, the wing-slat assembly 200, may provide an increase in lift for the aircraft during a take-off and landing operating condition of the aircraft.

More particularly, the wing-slat assembly 200 includes a slat assembly 100 that is functionally similar to the cowl assembly 100. The exemplary slat assembly 100 of FIG. 8 may be configured in substantially the same manner as the exemplary cowl assemblies of FIGS. 1 through 7, and accordingly, the same or similar numbers may refer to the same or similar parts.

For example, the exemplary wing-slat assembly 200 of FIG. 8 generally includes a forward slat that corresponds to a forward cowl 110 and a main element of the wing that corresponds to an aft cowl 120. Additionally, the wing-slat assembly 200 defines a thickness direction. Further, the wing-slat assembly 200 is movable to open a flow passage 140 in a deployed position (shown) and moveable to close the flow passage 140 in a stowed position. Notably, in at least certain exemplary embodiments, the forward slat (forward cowl 110) may be moveable to both translate and pivot relative to the main element of the wing (aft cowl 120) to open the flow passage 140. It should be appreciated, however, that in alternative exemplary embodiments the forward slat (forward cowl 110) may be moveable in various ways to open the flow passage 140. For example, the forward slat (forward cowl 110) may be moveable to translate, to rotate, or a combination thereof.

Figure 9:
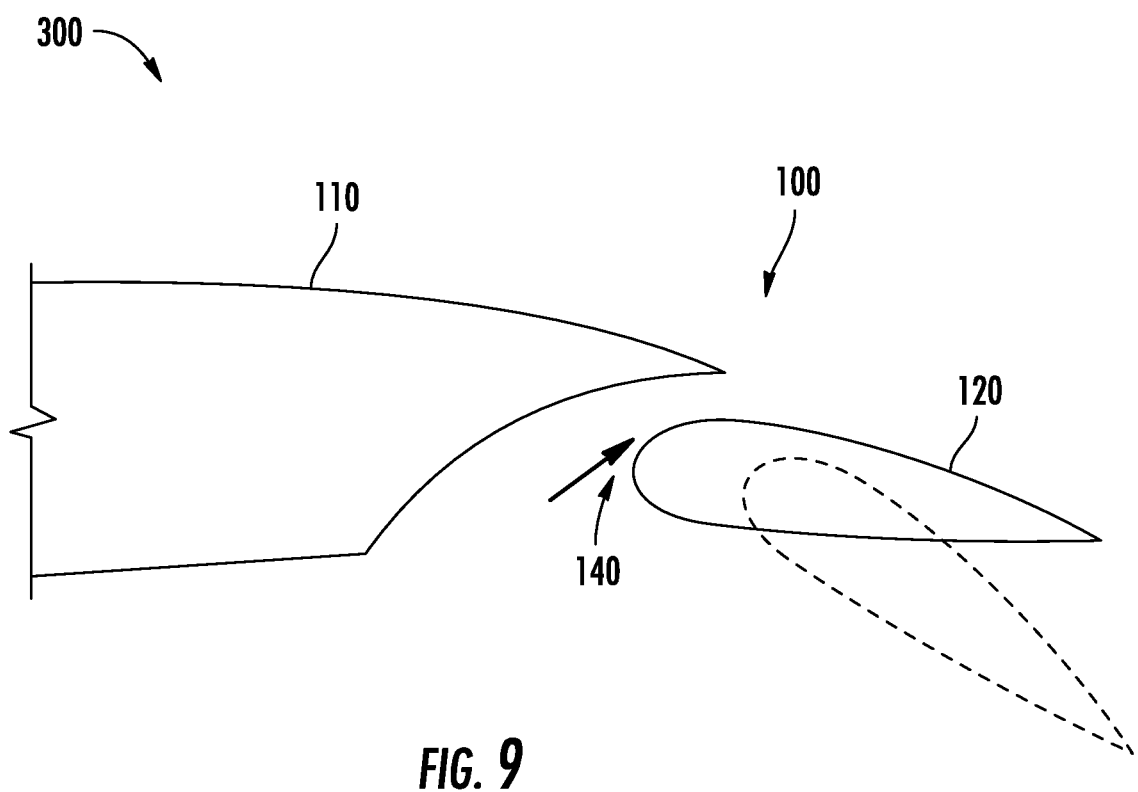
FIG. 9 is a simplified view of an aerodynamic device in accordance with another exemplary embodiment of the present disclosure.

Referring now to FIG. 9, a simplified view of an aerodynamic device in accordance with another exemplary embodiment of the present disclosure is provided. The aerodynamic device is a wing-flap assembly 300 for a high-lift wing of an aircraft. Conventionally, the wing-flap assembly 300 for the wing of the aircraft is moveable to produce increased lift during a low-speed operating condition of the aircraft. For example, during a takeoff and landing operating condition of the aircraft, the flap may be moveable to translate and rotate to open a flow passage during the low-speed operating condition.

More particularly, the wing-flap assembly 300 for the wing includes a flap assembly 100. The exemplary flap assembly 100 of FIG. 9 may be configured in substantially the same manner as the exemplary cowl assemblies 100 of FIGS. 1 through 8, and accordingly, the same or similar numbers may refer to the same or similar parts.

For example, the exemplary flap assembly 100 includes a forward wing main element that corresponds to a forward cowl 110, and an aft cowl 120. Further, the flap assembly 100 is moveable to open a flow passage 140 in a deployed position and moveable to close the flow passage 140 in a stowed position. However, for the embodiment of FIG. 9, the aft cowl 120 is moveable to translate and pivot (shown in phantom) relative to the forward wing main element (forward cowl 110) to open the flow passage 140 in the deployed position.

Further aspects are provided by the subject matter of the following clauses:

An aerodynamic device defining a thickness direction, the aerodynamic device configured to produce lift or thrust or configured to be a part of an aerodynamic system that produces lift or thrust, the aerodynamic device comprising: a cowl assembly defining at least in part an airflow stream, the cowl assembly comprising a first cowl and a second cowl moveable relative to the first cowl, the first cowl comprising a plurality of first cowl indentations at an end of the first cowl, the second cowl defining an outer surface along the thickness direction and an inner surface along the thickness direction, the second cowl comprising a plurality of second cowl indentations at an end of the second cowl, the plurality of second cowl indentations being complementary in shape to the plurality of first cowl indentations, wherein the plurality of second cowl indentations are positioned locally on the outer surface of the second cowl or locally on the inner surface of the second cowl.

The aerodynamic device of any preceding clause, wherein the first cowl is a forward cowl and the second cowl is an aft cowl, wherein the plurality of first cowl indentations is a plurality of forward cowl indentations, and wherein the plurality of second cowl indentations is a plurality of aft cowl indentations.

The aerodynamic device of any preceding clause, wherein the plurality of aft cowl indentations are positioned within a local region of the aft cowl.

The aerodynamic device of any preceding clause, wherein the forward cowl, the aft cowl, or both are moveable to open a flow passage in a deployed position and moveable to close the flow passage in a stowed position.

The aerodynamic device of any preceding clause, wherein the forward cowl defines a trailing edge, wherein the plurality of forward cowl indentations are located at the trailing edge of the forward cowl, and wherein the aft cowl defines a leading edge.

The aerodynamic device of any preceding clause, wherein the aft cowl defines a juncture where the trailing edge of the forward cowl meets the outer surface of the aft cowl when in the stowed position.

The aerodynamic device of any preceding clause, wherein the aft cowl indentations are positioned locally on the outer surface of the aft cowl at the juncture.

The aerodynamic device of any preceding clause, wherein the plurality of forward cowl indentations and the plurality of aft cowl indentations are scallops.

The aerodynamic device of any preceding clause, wherein the aft cowl defines a leading edge, wherein the forward cowl defines a trailing edge, an inner surface, and a juncture where the leading edge of the aft cowl meets the inner surface of the forward cowl when in a stowed position, wherein the forward cowl comprises a first plurality of forward cowl indentations positioned locally on the inner surface of the forward cowl at the juncture.

The aerodynamic device of any preceding clause, wherein the aft cowl comprises a second plurality of aft cowl indentations at the leading edge of the aft cowl, wherein the second plurality of forward cowl indentations are complementary in shape with the second plurality of aft cowl indentations.

The aerodynamic device of any preceding clause, wherein the plurality of forward cowl indentations and the plurality of aft cowl indentations are at least one of a step, a rib, a groove, a tab, a chevron, a tubercle, or any suitable combination thereof.

The aerodynamic device of any preceding clause, wherein the cowl assembly defines a circumferential or spanwise direction and wherein the plurality of forward cowl indentations and the plurality of aft cowl indentations have a yaw in the circumferential direction.

The aerodynamic device of any preceding clause, wherein the aerodynamic device is at least one of a variable exhaust nozzle, an inlet of a supersonic aircraft engine, a wing-flap, or a wing-slat.

The aerodynamic device of any preceding clause, wherein the first cowl is an aft cowl and the second cowl is a forward cowl, wherein the plurality of first cowl indentations is a plurality of aft cowl indentations, and wherein the plurality of second cowl indentations is a plurality of forward cowl indentations.

A turbofan engine defining a thickness direction and axial direction, the gas turbine engine comprising: a turbomachine comprising a compressor section, a combustor section, and a turbine section arranged in serial flow order; a fan coupled to be driven by the turbine section; and a cowl assembly defining at least in part an airflow stream, the cowl assembly comprising a first cowl and a second cowl moveable relative to the first cowl, the first cowl comprising a plurality of first cowl indentations at an end of the first cowl, the second cowl defining an outer surface along the thickness direction and an inner surface along the thickness direction, the second cowl comprising a plurality of second cowl indentations at an end of the second cowl, the plurality of second cowl indentations being complementary in shape to the plurality of first cowl indentations, wherein the plurality of second cowl indentations are positioned locally on the outer surface of the second cowl or locally on the inner surface of the second cowl.

The turbofan engine of any preceding clause, wherein the first cowl is a forward cowl and the second cowl is an aft cowl, wherein the plurality of first cowl indentations is a plurality of forward cowl indentations, and wherein the plurality of second cowl indentations is a plurality of aft cowl indentations.

The turbofan engine of any preceding clause, wherein the plurality of aft cowl indentations are positioned within a local region of the aft cowl.

The turbofan engine of any preceding clause, wherein the forward cowl, the aft cowl, or both are moveable to open a flow passage in a deployed position and moveable to close the flow passage in a stowed position.

The turbofan engine of any preceding clause, wherein the forward cowl defines a trailing edge, wherein the plurality of forward cowl indentations are located at the trailing edge of the forward cowl, and wherein the aft cowl defines a leading edge.

The turbofan engine of any preceding clause, wherein the aft cowl defines a juncture where the trailing edge of the forward cowl meets the outer surface of the aft cowl when in the stowed position.

The turbofan engine of any preceding clause, wherein the aft cowl indentations are positioned locally on the outer surface of the aft cowl at the juncture.

The turbofan engine of any preceding clause, wherein the plurality of forward cowl indentations and the plurality of aft cowl indentations are scallops.

The turbofan engine of any preceding clause, wherein the aft cowl defines a leading edge, wherein the forward cowl defines a trailing edge, an inner surface, and a juncture where the leading edge of the aft cowl meets the inner surface of the forward cowl when in a stowed position, wherein the forward cowl comprises a second plurality of forward cowl indentations positioned locally on the inner surface of the forward cowl at the juncture.

The turbofan engine of any preceding clause, wherein the aft cowl comprises a second plurality of aft cowl indentations at the leading edge of the aft cowl, wherein the second plurality of forward cowl indentations are complementary in shape with the second plurality of aft cowl indentations.

The turbofan engine of any preceding clause, the gas turbine engine of claim 1, wherein the plurality of forward cowl indentations and the plurality of aft cowl indentations are at least one of a step, rib, groove, tubercle, tab, chevron, or any suitable combination thereof.

The turbofan engine of any preceding clause, wherein the cowl assembly defines a circumferential direction and wherein the forward cowl indentations and the aft cowl indentations have a yaw in the circumferential direction.

The turbofan engine of any preceding clause, at least one of a variable exhaust nozzle, an inlet of a supersonic aircraft engine, a wing flap, or a wing-slat.

A variable area exhaust nozzle for a gas turbine engine, the gas turbine engine comprising a fan and a turbomachine and defining a radial direction and an axial direction, the variable area exhaust nozzle comprising: a cowl assembly defining at least in part an airflow stream over, through, or into the turbomachine, the fan, or both, the cowl assembly comprising a forward cowl and an aft cowl, the forward cowl comprising a plurality of forward cowl indentations, the aft cowl defining an outer surface along the radial direction and a plurality of aft cowl indentations complementary in shape to the plurality of forward cowl indentations, wherein the plurality of aft cowl indentations are positioned locally on the outer surface of the aft cowl.

The variable area exhaust nozzle for a gas turbine of any preceding claims, wherein the forward cowl and the aft cowl are movable to open a flow passage in a deployed position and moveable to close the flow passage in a stowed position.

The variable area exhaust nozzle for a gas turbine of any preceding claims, wherein the forward cowl defines a trailing edge, wherein the plurality of forward cowl indentations are located at the trailing edge of the forward cowl, and wherein the aft cowl defines a leading edge.

The variable area exhaust nozzle for a gas turbine of any preceding claims, wherein the aft cowl defines a juncture where the trailing edge of the forward cowl meets the outer surface of the aft cowl when in a stowed position.

The variable area exhaust nozzle for a gas turbine of any preceding claims, wherein the aft cowl indentations are positioned locally on the outer surface of the aft cowl at the juncture.

The variable area exhaust nozzle for a gas turbine of any preceding claims, wherein the plurality of forward cowl indentations and the plurality of aft cowl indentations are scallops.

The variable area exhaust nozzle for a gas turbine of any preceding claims, wherein the plurality of forward cowl indentations and the plurality of aft cowl indentations are at least one of a rib, groove, tubercle, or any suitable combination thereof.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An aerodynamic device defining a thickness direction, the aerodynamic device configured to produce lift or thrust or configured to be a part of an aerodynamic system that produces lift or thrust, the aerodynamic device comprising:
   a cowl assembly defining at least in part an airflow stream, the cowl assembly comprising a first cowl and a second cowl moveable relative to the first cowl, the first cowl comprising a plurality of first cowl indentations at an end of the first cowl, the second cowl defining an outer surface along the thickness direction and an inner surface along the thickness direction, the second cowl comprising a plurality of second cowl indentations at an end of the second cowl, the plurality of second cowl indentations being complementary in shape to the plurality of first cowl indentations, wherein the plurality of second cowl indentations are positioned locally on the outer surface of the second cowl or locally on the inner surface of the second cowl,
   wherein the second cowl defines an edge at a tip of the inner surface or at a tip of the outer surface, and wherein the plurality of second cowl indentations are encompassed within a local region spaced from the edge, and wherein the plurality of second cowl indentations are discontinuous around the end of the second cowl.

2. The aerodynamic device of claim 1, wherein the first cowl is a forward cowl and the second cowl is an aft cowl, wherein the plurality of first cowl indentations is a plurality of forward cowl indentations, and wherein the plurality of second cowl indentations is a plurality of aft cowl indentations, and wherein the cowl assembly includes a support member that extends from the end of the first cowl along an axial direction and is mechanically coupled to the second cowl.

3. The aerodynamic device of claim 2, wherein the local region is a local region of the aft cowl and wherein the edge is a leading edge of the aft cowl.

4. The aerodynamic device of claim 2, wherein the forward cowl, the aft cowl, or both are moveable to open a flow passage in a deployed position and moveable to close the flow passage in a stowed position.

5. The aerodynamic device of claim 4, wherein the forward cowl defines a trailing edge, wherein the plurality of forward cowl indentations is located at the trailing edge of the forward cowl, and wherein the aft cowl defines a leading edge.

6. The aerodynamic device of claim 5, wherein the aft cowl defines a juncture where the trailing edge of the forward cowl meets the outer surface of the aft cowl when in the stowed position.

7. The aerodynamic device of claim 6, wherein the aft cowl indentations are positioned locally on the outer surface of the aft cowl at the juncture.

8. The aerodynamic device of claim 2, wherein the plurality of forward cowl indentations and the plurality of aft cowl indentations are scallops.

9. The aerodynamic device of claim 8, wherein the edge is a leading edge of the aft cowl, wherein the forward cowl defines a trailing edge, an inner surface, and a juncture where the leading edge of the aft cowl meets the inner surface of the forward cowl when in a stowed position, wherein a second plurality of forward cowl indentations is positioned locally on the inner surface of the forward cowl at the juncture.

10. The aerodynamic device of claim 9, wherein a second plurality of aft cowl indentations is positioned at the leading edge of the aft cowl, wherein the second plurality of forward cowl indentations is complementary in shape with the second plurality of aft cowl indentations.

11. The aerodynamic device of claim 2, wherein the plurality of forward cowl indentations and the plurality of aft cowl indentations are at least one of a step, a rib, a groove, a tab, a chevron, a tubercle, or any suitable combination thereof.

12. The aerodynamic device of claim 11, wherein the cowl assembly defines a circumferential or spanwise direction and wherein the plurality of forward cowl indentations and the plurality of aft cowl indentations have a yaw in the circumferential direction.

13. The aerodynamic device of claim 1, wherein the aerodynamic device is at least one of a variable exhaust nozzle, an inlet of a supersonic aircraft engine, a wing-flap, or a wing-slat.

14. A turbofan engine defining a thickness direction and axial direction, the turbofan engine comprising:
 a turbomachine comprising a compressor section, a combustor section, and a turbine section arranged in serial flow order;
 a fan coupled to be driven by the turbine section; and
 a cowl assembly defining at least in part an airflow stream, the cowl assembly comprising a first cowl and a second cowl moveable relative to the first cowl, the first cowl comprising a plurality of first cowl indentations at an end of the first cowl, the second cowl defining an outer surface along the thickness direction and an inner surface along the thickness direction, the second cowl comprising a plurality of second cowl indentations at an end of the second cowl, the plurality of second cowl indentations being complementary in shape to the plurality of first cowl indentations, wherein the plurality of second cowl indentations is positioned locally on the outer surface of the second cowl or locally on the inner surface of the second cowl,
 wherein the second cowl defines an edge at a tip of the inner surface or at a tip of the outer surface, and wherein the plurality of second cowl indentations is encompassed within a local region spaced from the edge, and wherein the plurality of second cowl indentations are discontinuous around the end of the second cowl.

15. The turbofan engine of claim 14, wherein the first cowl is a forward cowl and the second cowl is an aft cowl, wherein the plurality of first cowl indentations is a plurality of forward cowl indentations, and wherein the plurality of second cowl indentations is a plurality of aft cowl indentations, and wherein the cowl assembly includes a support member that extends from the end of the first cowl along the axial direction and is mechanically coupled to the second cowl.

16. The turbofan engine of claim 15, wherein the local region is a local region of the aft cowl and wherein the edge is a leading edge of the aft cowl.

17. The turbofan engine of claim 15, wherein the forward cowl, the aft cowl, or both are moveable to open a flow passage in a deployed position and moveable to close the flow passage in a stowed position.

18. The turbofan engine of claim 17, wherein the forward cowl defines a trailing edge, wherein the plurality of forward cowl indentations is located at the trailing edge of the forward cowl, and wherein the aft cowl defines a leading edge.

19. The turbofan engine of claim 18, wherein the aft cowl defines a juncture where the trailing edge of the forward cowl meets the outer surface of the aft cowl when in the stowed position.

* * * * *